July 16, 1968  H. J. ORR  3,393,394
METER SOCKET ADAPTER
Filed Jan. 26, 1966  2 Sheets-Sheet 1
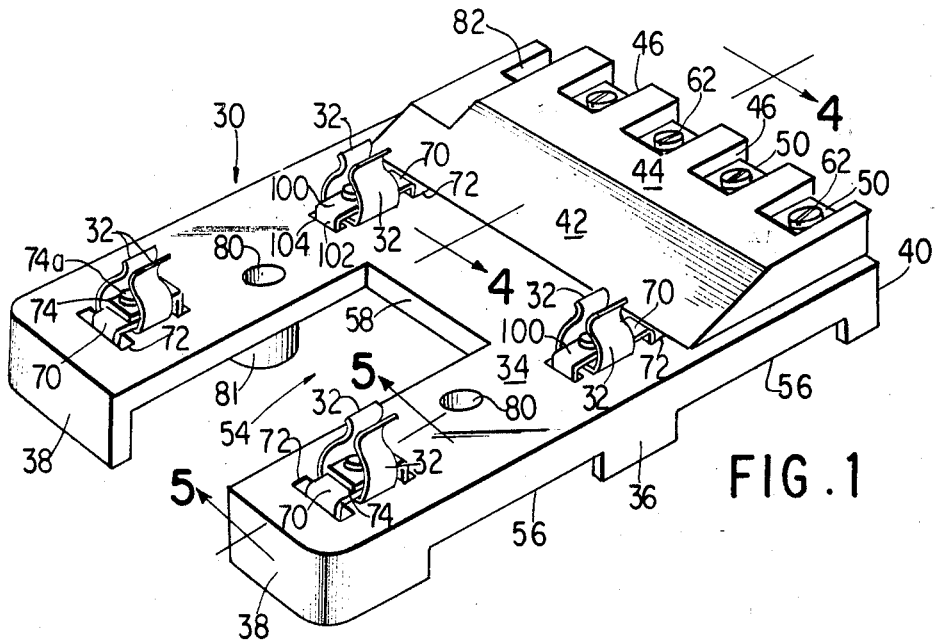
INVENTOR
HARLEY J. ORR
BY
Smythe & Moore
ATTORNEYS July 16, 1968  H. J. ORR  3,393,394
METER SOCKET ADAPTER
Filed Jan. 26, 1966  2 Sheets-Sheet 2
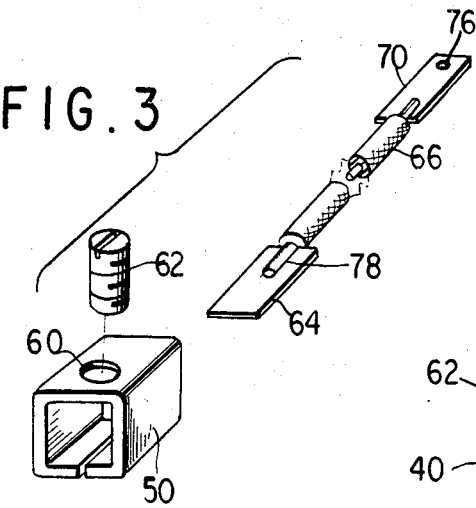
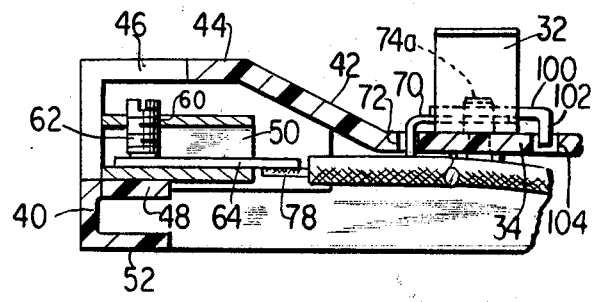
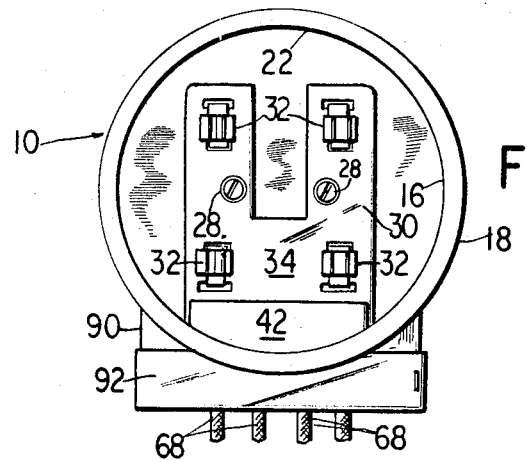
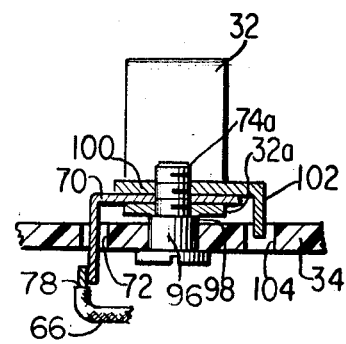
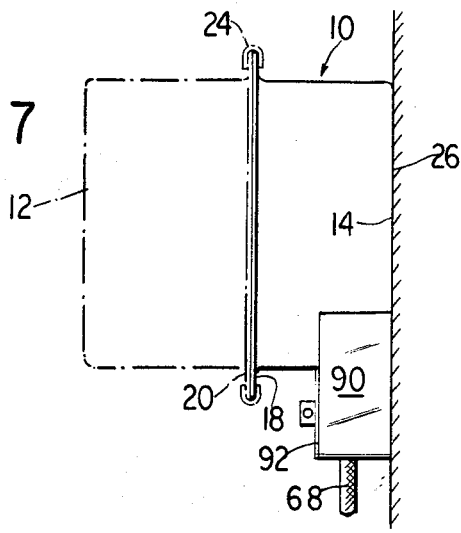
INVENTOR
HARLEY J. ORR
BY
Smythe & Moore
ATTORNEYS

United States Patent Office 3,393,394
Patented July 16, 1968

3,393,394
METER SOCKET ADAPTER
Harley J. Orr, Bedford, N.H., assignor to Sola Basic Industries, Inc., Milwaukee, Wis., a corporation of Wisconsin
Filed Jan. 26, 1966, Ser. No. 523,144
10 Claims. (Cl. 339—64)

ABSTRACT OF THE DISCLOSURE

A socket adapter for electric meters in which a unitary base member comprises an inverted tray-like shell member of insulating material positionable through the meter receiving opening of an adapter housing having a laterally extending portion for a terminal portion of the base member. The base shell member carries contact jaws which are self-adjustable for alignment with the blades of a meter and the connectors for the jaw contacts are positioned in a protected position within the hollow space provided by the tray-like shell member.

---

This invention relates to meter mounts and more particularly to a socket adapter for the mounting of an electric meter such as a watt-hour meter.

Various assemblies of adapters and sockets for detachably mounting and making electrical connections to a watt-hour meter or the like have been proposed.

An object of the present invention is to provide a new and improved socket adapter that is simpler and more rugged in construction, less expensive to manufacture, and easier to install or assemble than prior devices of this character.

A further object of the invention is to provide a simple and light-weight socket adapter structure in which all of the electrical sockets, connections and terminals are contained in or on a single, relatively strong base block or member that can be readily installed in an adapter housing.

A further object of the invention is to provide a socket adapter that is free of any loose wires and in which all of the electrical connections are protected against exposure and accidental or other damage during normal use of the mount.

A still further object of the invention is to provide a socket adapter in which the jaw contacts of the adapter are mounted for individual self-alignment with the contact blades of a meter without loosening of either the mounting means or the electrical contact, thereby eliminating hot spots and the like in the terminal connections and jaw contacts.

In its preferred aspect, the invention is adapted for use with a meter having contact blades projecting from the base or rear thereof such as is common in watt-hour meters of the plug-in type, for example. The meter mount comprises an adapter housing for receiving the base of the meter and a single light-weight base or block of molded insulating material on which the jaw contacts or sockets for receiving the contact blades are mounted and whichc is so shaped as to provide a protective cover or enclosure for the electrical connectors and a terminal portion for housing and enclosing the terminal connectors. The entire base, socket and connector unit can be readily and simply installed in the adapter housing, and provides a very inexpensive and rugged socket adapter assembly. Additionally, in the preferred aspect of the invention, the jaw contacts or sockets are mounted for limited rotation or floatation on the base block so as to be self-aligning with the contact blades of the meter without loosening the jaws or the electrical contact therewith.

The foregoing and other features, objects and advantages of the invention will be apparent from the following description and accompanying drawings which are merely exemplary.

In the drawings:

FIG. 1 is a perspective view of the top or outer side of the socket adapter assembly;

FIG. 2 is a perspective view of the under or inner side of the assembly;

FIG. 3 is a broken perspective view of one of the connectors and a terminal connection unit;

FIG. 4 is a vertical section taken on the line 4—4 of FIG. 1;

FIG. 5 is an enlarged sectional view of one of the jaw contact mounting means taken along the line 5—5 of FIG. 1;

FIG. 6 is an elevational view looking from the front or meter side of the adapter, with the meter removed; and FIG. 7 is a side elevational view of the adapter with a meter mounted therein.

Referring to the drawings, and first to FIGS. 6 and 7, there is shown an adapter 10 which is adapted to receive the base portion (not shown) of a meter 12 having contact or terminal blades of the plug-in type (also not shown). Adapter 10 comprises a generally cylindrical housing having a rear wall 14, an annular wall 16 and a flange 18 adapted to cooperate with a flange 20 on the meter 12, the base or rear portion of the meter being received within the circular opening 22 of the adapter housing. Flanges 18 and 20 may be secured together by a suitable retaining ring or the like as indicated at 24, and the rear wall of the housing is adapted to be mounted on any desired surface 26 such as the wall of a building.

Mounted within the adapter housing and secured to the rear wall 14 thereof by screws 28 or the like is a base block or member 30 which carries contact jaws or sockets 32 adapted to receive and clamp the contact blades projecting from the base of meter 12. In the illustrated embodiment of the invention, four symmetrically arranged jaws 32 are provided to correspond to the four contact blades usually provided on watt-hour meters. If desired, a fifth contact jaw to accommodate certain meters may be readily added in a manner hereinafter described.

The base block or member 30 is preferably molded from a phenolic or similar insulating material, and, as shown in FIGS. 1 and 2, is of a generally box or shell-like structure having side flanges, reinforcing ribs and bosses to make it light in weight but also rigid and strong. More particularly, the base block or member 30 is generally rectangular in shape and comprises an upper or top plate 34, side flanges or walls 36 and end flanges or walls 38 and 40. The top plate 34 slopes upwardly adjacent the end 40 as indicated at 42 in FIGS. 1, 2 and 4, to provide a raised portion 44 which is provided with a plurality of slots 46 that extend downwardly into the end wall 40 and communicate with the hollow space on the underside of plate 34 formed by walls 36, 38 and 40, as best shown in FIG. 4. As further shown in FIG. 4, the end wall 40 is also provided with inwardly extending flanges or walls 48 at the lower ends of slots 46 to serve as seats for terminal members 50 to be hereinafter more fully described. The bottom edge of end wall 40 is also preferably provided with an inturned flange or member 52, FIGS. 2 and 4, which connects with the side flanges or walls 36 to give increased strength and rigidity to the base member. Top plate 34 and side flanges or walls 36 are also preferably provided with cut-away portions 54 and 56, respectively, to save material and reduce weight. Flanges or ribs 58 are provided along the side edges of the cut-away portion 54 to give increased rigidity and strength.

As best shown in FIGS. 3 and 4, the terminal members 50 which are positioned in the slots 46 and seat on the wall members 48 comprise a flat sheet of electrically conducting metallic material bent to form a tubular member of substantially rectangular cross section and provided with a tapped hole 60 in its upper wall into which a set screw 62 is threaded. A flat terminal member 64, adapted to fit into the tubular terminal member 50, is attached to one end of a conductor 66 and is clamped against the bottom of the member 50 by the set screw 62. The set screw 62 and the stiffeners of conductor 66 serve to retain the terminal member 50 in position within the slot 46. When it is desired to connect an external conductor, such as a power line 68 (FIG. 7), to the socket adapter, the set screw 62 is loosened, an end terminal of the external line is inserted within the tubular terminal member 50 above the flat terminal member 64, and the set screw 62 is retightened to clamp the conductor terminals together and against the bottom wall of member 50. Set screws 62 are readily accessible for attaching the external conductors through the open tops of slots 46 in raised portion 44 of top plate 34, as seen in FIG. 1.

A second flat terminal member 70 (FIG. 3) is attached to the other end of conductor 66 and is inserted through a slot 72 (FIGS. 1, 2, 4 and 6) provided in top plate 34 adjacent one of the jaw contacts 32. The terminal member 70 is then bent at a right angle (FIGS. 1, 4 and 6) to lie over the bottom portion 32 of jaw contact or socket 32 and to be clamped in electrically conducting contact therewith by a screw or the like 74 and nut 100 which mount the contact jaw 32 on the top plate 34 of base member or block 30. The terminal member 70 is provided with a hole 76 for receiving shank 74A of screw 74 and is sufficiently pliable to be bent as above described, while also having sufficient strength rigidly to support the conductor 66 whereby tubular terminal member 50 is retained in proper position. Any desired means may be employed to attach the terminal members 64 and 70 to the conductor 66, but a welded connection as indicated at 78 in FIGS. 3, 4 and 5 is preferable to give added strength, rigidity and durability.

As above set forth, the illustrated embodiment of the invention shows four symmetrically arranged contact jaws or sockets for receiving the four contact blades of a conventional watt-hour meter. Four sets of tubular terminal members 50, conductors 66, and conductor end terminals 64 and 70 are thus provided, and one of the slots 72 is also provided adjacent each jaw contact 32. Referring to FIGS. 1 and 2, there are openings 80 and reinforcing or supporting bosses 81 on the base member 30 at the points where the screws 28 pass through base member 30 to secure it to rear wall 14 of housing 10. Should it be necessary to adapt the illustrated socket adapter assembly to a meter having five contact blades, an additional jaw contact and terminal member or assembly can be readily installed and clamped in position by one of the mounting screws 28, the cutout space 54 in top plate 34 providing access to an additional conductor 66. For this purpose an additional slot 82 for receiving a terminal member 50 is provided and an additional conductor 66 would be provided.

Attached to, or integrally formed with, the adapter housing 10 is a laterally extending housing portion 90 (FIGS. 6 and 7) of substantially rectangular shape which communicates with the interior of housing 10 and is provided with openings for the external conductors 68 and a removable cover plate 92. The raised portion 44 of base block or member 30 is adapted to fit within the housing portion 90 when the base member 30 is inserted through opening 16 of adapter housing 10 and mounted on the rear wall 14 of housing 10 by screws 28 or the like. Set screws 62 and terminal members 50 are then readily accessible by removal of cover plate 92 which may be secured to housing portion 90 by any suitable means (not shown). The base block or member 30 thus comprises a unitary subassembly of jaw contact sockets, terminal connectors and intermediate wiring which is simple and inexpensive to manufacture and is easily installed. All connecting wires within the subassembly are further protected from accidental or other damage during normal use of the meter mount.

Another feature of the invention resides in the manner in which the contact jaws or sockets 32 are mounted on the base block or member 34. As best shown in FIG. 5, the mounting screw 74 is provided with a shoulder portion 96 which is of slightly greater thickness or length than the thickness of top plate 34 of base member 30. Thus, top plate 34 may have a thickness of 0.100" and shoulder 96 a depth of 0.112". Shoulder 96 thus extends slightly above the upper surface of top plate 34 and supports the bottom portion 32A of jaw 32 a slight distance 98 (exaggerated in FIG. 5) above the top surface of plate 34. Terminal portion 70 of conductor 66 overlies portion 32A of jaw 32 as above described, and an elongated nut 100 (FIGS. 1, 4 and 5) overlies terminal portion 70 and is threadedly engaged by the threaded shank 74A of screw 74. Nut 100 extends between the two side members of jaw 32 and is provided with a downwardly extending leg or portion 102 which is adapted to project into a second slot 104 provided in top plate 34 of base member 30. Slots 104 are of such length as to permit limited rotation of jaw contacts 32 about the axes of mounting screws 74 to effect individual alignment of jaw contacts 32 with the contact blades of an inserted meter. Since the entire mounting means including the socket jaws 32, screw 74, terminal 70 and nut 100 float on the base member and move as a unit, there is no loosening of the jaw socket mountings or the electrical connections thereto upon aligning movement or rotation of the jaw contacts, and hot spots or other disadvantages of a loose connection or of an improper or uneven contact between jaw and blade are avoided. The length of slots 104 is such that the jaw sockets 32 are maintained in proper position to receive the meter contact blades, while permitting limited movement of the jaw contacts to accommodate for slight differences in the angularity of the individual blades.

While a preferred embodiment of the invention with a certain described modification has been set forth, it will be apparent from the above description that other modifications and changes may be made in the described structure, and it is intended that the invention be limited only by the scope of the appended claims.

What is claimed is:

1. In a socket adapter for electrical meters, the combination of an adapter housing having an opening for receiving the base of a meter and a laterally extending portion for receiving and enclosing the end terminals of external electrical conductors for the meter, a unitary contact and terminal assembly for said adapter of such size and shape as to be receivable through said opening in the adapter housing and having a portion extending into the laterally extending portion of said housing, said assembly comprising a formed member of insulating material having an upper surface and a hollow space beneath said surface, jaw contacts mounted on said upper surface, terminal means for detachably receiving and clamping the ends of said external conductors positioned in said portion extending into the laterally extending portion of said housing, electrical connectors contained in said hollow space beneath said upper surface for connecting said jaw contacts with said terminal means, and fastening means accessible through said opening of the adapter housing for mounting said formed member on the rear wall of said adapter housing, whereby said unitary assembly is insertable through said opening and readily installed in the housing with said contact jaws facing said housing opening and said connectors protected by the upper surface of the base member.

2. A combination as set forth in claim 1 in which said jaw contacts are mounted for individual limited rotation about the axis of its mounting means for self-alignment with contact blades on said meter.

3. A combination as set forth in claim 1 in which said laterally extending portion of the adapter housing is provided with a removable cover, and said terminal means is readily accessible for attaching external conductors upon removal of said cover.

4. A unitary socket adapter assembly for electrical meter mounts comprising a thin-walled, inverted, tray-like shell member formed of insulating material and providing a base member having an upper surface and depending side and end flanges forming a hollow space beneath said surface, one end flange of said base shell member being provided with openings communicating with said hollow space, a plurality of blade-receiving jaw contacts mounted on said upper surface, terminal connecting means for detachably connecting ends of external conductors positioned within said openings, and electrical connectors positioned within said hollow space to be protected by said upper surface for connecting said jaw contacts and said terminal connecting means.

5. A unitary socket adapter assembly as set forth in claim 4 in which said upper surface has a raised portion adjacent said end flange having said openings communicating with said hollow space, communicating slots are provided in said raised portion and said end flange, and a portion of said terminal connecting means is positioned within said slots and accessible through the upper portions thereof for detachably connecting said external conductors.

6. A unitary socket adapter assembly as set forth in claim 4 in which portions of said upper surface and said flanges are cut away to reduce material and weight, and strengthening ribs are provided along the side edges of said cut-away portion of the upper surface to provide rigidity.

7. A unitary socket adapter assembly as set forth in claim 4 in which said upper surface of said base member is provided with a slot adjacent a plurality of said jaw contacts, a plurality of said connecting conductors is provided with an elongated flat metallic terminal, and said last named terminals extend through said slots and are bent to be clamped against said jaw contacts, whereby the conductors are fixedly retained in protected position within said hollow space of the base member.

8. A unitary socket adapter assembly as set forth in claim 4 in which the mounting means for said jaw contacts comprises a plurality of individual rotatable members extending through said base member, means for attaching a separate jaw contact to each of said rotatable members, and means for limiting rotation of said jaw contacts about the axis of its rotatable member, whereby the jaw contacts are maintained in proper position to receive contact blades but are individually self-aligning to adjust to differences in angularity of individual blades.

9. A unitary socket adapter assembly as set forth in claim 8 in which said rotatable member comprises a screw-like member having a shoulder of greater depth than the thickness of said upper surface of said base member, a bottom portion of a jaw contact is receivable upon said shoulder portion of said screw-like member, a terminal portion of one of said electrical connectors is receivable upon said shoulder portion, a nut-like member having a laterally extending portion overlies and clamps said bottom portion of the jaw contact and said last named terminal portion to said shoulder, and said means for limiting rotation comprises a depending member attached to said laterally extending portion of said nut-like member and extending into a slot provided in said upper surface of the base member.

10. A socket adapter for electrical meters comprising a base member, a screw-like member extending through said base member and having a circular shoulder portion and a threaded shank, said shoulder portion having a slightly greater depth than the thickness of said base member and a slightly less diameter than its opening through the base member, a jaw contact member having a bottom portion receivable upon said shoulder, a terminal member for an electrical connector receivable on said shoulder in electrical contact with said jaw member, and a nut-like member engageable with said threaded shank and adapted to overlie and clamp said bottom portion of the jaw contact member and said terminal member against said shoulder, said base member being provided with a slotted recess adjacent said jaw contact member, and said nut-like member being provided with a lateral extension having a downwardly extending lip portion receivable within said slotted recess and of lesser width than the length of said recess, whereby said jaw contact member, said terminal member and said nut-like member can rotate as a unit about the axis of said screw-like member to permit self-alignment of said jaw contact member with a blade contact.

References Cited
UNITED STATES PATENTS

| | | |
|---|---|---|
| 2,538,912 | 1/1951 | Road et al. |
| 2,592,299 | 4/1952 | Lewis. |
| 3,151,924 | 10/1964 | Sloop. |
| 3,221,216 | 11/1965 | Kobryner _____ 317—104 |

MARVIN A. CHAMPION, *Primary Examiner.*

P. A. CLIFFORD, *Examiner.*